US 6,585,155 B2

United States Patent
Nishimura

(10) Patent No.: US 6,585,155 B2
(45) Date of Patent: Jul. 1, 2003

(54) IC CARD, IC CARD ISSUING APPARATUS, IC CARD ISSUING SYSTEM AND IC CARD ISSUING METHOD

(75) Inventor: Saori Nishimura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/109,047

(22) Filed: Mar. 29, 2002

(65) Prior Publication Data

US 2002/0134832 A1 Sep. 26, 2002

Related U.S. Application Data

(63) Continuation of application No. PCT/JP99/05388, filed on Sep. 30, 1999.

(51) Int. Cl.[7] .................................................. G06F 7/08
(52) U.S. Cl. ........................................ 235/381; 235/375
(58) Field of Search .................................. 235/375, 381, 235/383, 380, 379, 441, 490, 492, 486, 487

(56) References Cited

U.S. PATENT DOCUMENTS

| | | | | |
|---|---|---|---|---|
| 4,602,149 A | * | 7/1986 | Tateisi et al. ............... | 380/270 |
| 4,988,855 A | | 1/1991 | Iijima ......................... | 235/492 |
| 5,285,200 A | * | 2/1994 | Kuriyama .................... | 235/381 |
| 5,929,428 A | * | 7/1999 | Iijima ......................... | 235/492 |
| 2002/0114468 A1 | * | 8/2002 | Nishimura ................... | 380/270 |
| 2002/0134832 A1 | * | 9/2002 | Nishimura ................... | 235/381 |

FOREIGN PATENT DOCUMENTS

| | | | |
|---|---|---|---|
| EP | 895 204 | | 2/1999 |
| EP | 1220148 A1 | * | 7/2002 |
| JP | 409044618 A | * | 2/1997 |
| JP | 9-106445 | | 4/1997 |

* cited by examiner

*Primary Examiner*—Thien M. Le
(74) *Attorney, Agent, or Firm*—Pillsbury Winthrop LLP

(57) ABSTRACT

An IC card issuing apparatus sends a key setting command accompanied with a key to an IC card. The IC card receives the key setting command and the key accompanying the key setting command is set to the IC card. The IC card issuing apparatus sends a special key setting command accompanied with a key to the IC card. The IC card receives the special key setting command and the key accompanying the key setting command is set to the IC card. Further, a set key process result is generated based on all keys set to the IC card. The IC card sends the set key process result to the IC card issuing apparatus. The IC card issuing apparatus receives the set key process result, and confirms whether a normal key is set to the IC card based on the set key process result.

16 Claims, 10 Drawing Sheets

| Contents of command codes | Accompanying data | Display output information |
|---|---|---|
| Command code 1 | Contents of command code 1 | × |
| Command code 2 | Contents of command code 2 | × |
| ...... | ...... | ...... |
| Command code 18 | Contents of command code 18 | Key input screen: Key 1 |
| Command code 19 | Contents of command code 19 | Key input screen: Key 2 |
| Command code 20 | Contents of command code 20 | × |
| ...... | ...... | ...... |
| Command code 25 | Contents of command code 25 | Key input screen: Key N | Key input result screen: Set key process result |
| ...... | ...... | ...... |
| Command code 30 | Contents of command code 30 | × |
| Command code 31 | Contents of command code 31 | × |
| ...... | ...... | ...... |

FIG. 6

| Command code | Contents of command codes | Accompanying data | IC output information |
|---|---|---|---|
| Command code 1 | Contents of command code 1 | X | 9000 |
| Command code 2 | Contents of command code 2 | X | 9000 |
| ...... | ...... | ...... | ...... |
| Command code 18 | Contents of command code 18 | Key input screen : Key 1 | 9000 |
| Command code 19 | Contents of command code 19 | Key input screen : Key 2 | 9000 |
| Command code 20 | Contents of command code 20 | X | 9000 |
| ...... | ...... | ...... | ...... |
| Command code 25 | Contents of command code 25 | Key input screen : Key N | 543212345432109000 |
| ...... | ...... | ...... | |
| Command code 30 | Contents of command code 30 | X | 9000 |
| Command code 31 | Contents of command code 31 | X | 9000 |
| ...... | ...... | ...... | |

FIG. 11

IC CARD, IC CARD ISSUING APPARATUS, IC CARD ISSUING SYSTEM AND IC CARD ISSUING METHOD

CROSS REFERENCE TO RELATED APPLICATIONS

This is a Continuation Application of PCT Application No. PCT/JP99/05388, filed Sep. 30, 1999, which was not published under PCT Article 21(2) in English.

BACKGROUND OF THE INVENTION

1. Field of the Invention

The present invention relates to an IC card having a control element such as a CPU. The present invention also relates to an IC card issuing apparatus for issuing the aforementioned IC card. Further, the present invention relates to an IC card issuing system including the aforementioned IC card and the aforementioned IC card issuing apparatus. Furthermore, the present invention relates to an IC card issuing method to issue the aforementioned IC card.

2. Description of the Related Art

An IC card is known as a portable information storage medium. The IC card has an IC chip inside thereof and a magnetic recording portion (magnetic stripes) on the outer side. The IC chip includes a CPU serving as an arithmetic processing portion, a non-volatile data memory, etc.

In general, an IC card is issued by a card issuing apparatus managed by a card issuing company. The card issuing apparatus stores various data required when an IC card is issued. The data required when an IC card is issued include IC command data, magnetic encode data, print data, etc.

The IC command data stored in the card issuing apparatus is input to the CPU of the IC card from the card issuing apparatus. The magnetic encode data stored in the card issuing apparatus is written into the magnetic recording portion of the IC card from the card issuing apparatus. Further, the print data stored in the card issuing apparatus is printed as an image on the surface of the IC card from the card issuing apparatus.

The aforementioned process executed in accordance with the input of the IC command data to the CPU of the IC card is one of the most important processes of the IC card issuing processes. The IC card (the CPU in the IC card) returns a response in accordance with the process result of the input IC command data. The card issuing apparatus determines whether the command based on the IC command data has been successively executed or not based on the response returned from the IC card.

Further, to retain a high level of security, a plurality of keys are set as a key group in the data memory of the IC card. Processes of data encapsulation and data validity confirmation are executed by utilizing the key group. Setting of the key group in the data memory is executed on the basis of a key setting command, which is one of the IC command data issued by the card issuing apparatus. The key group to be set is input by an operator through the keyboard of the card issuing apparatus.

However, the key group input by the operator is not necessarily correct. Further, the key group input by the operator and set in the IC card cannot be read out of the IC card. This is to prevent the important key group necessary for an authentication process from externally leaking. Moreover, when the key is set in the IC card by the card issuing apparatus, if the key is set in the IC card, a response representing normal end is returned from the IC card, regardless of whether the set key is correct or not. In other words, a problem is that there is no means to confirm whether the key set in the IC card is a normal correct key or not.

BRIEF SUMMARY OF THE INVENTION

Based on the above problem, an object of the present invention is to provide an IC card, an IC card issuing apparatus, an IC card issuing system and an IC card issuing method, which can prevent a plurality of keys to retain the security of the IC card from being incorrectly set in the IC card.

BRIEF DESCRIPTION OF THE SEVERAL VIEWS OF THE DRAWING

FIG. 6 is a diagram showing a first example of a command code data base file stored in the HDD of the card issuing apparatus;

FIG. 11 is a diagram showing a second example of a command code data base file stored in the HDD of the card issuing apparatus;

DETAILED DESCRIPTION OF THE INVENTION

An embodiment of the present invention will be described below with reference to the drawings.

Figure 1:
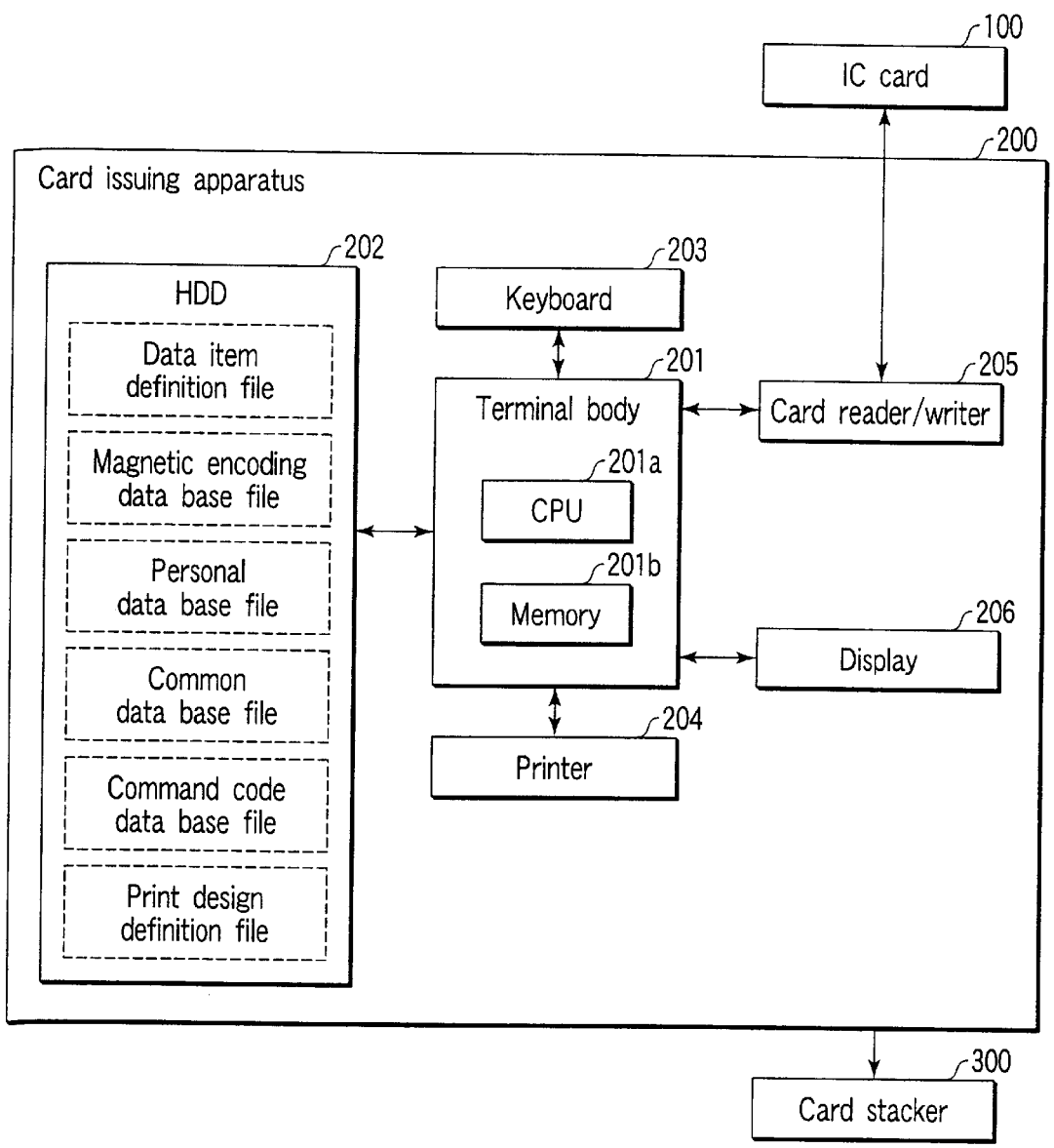
FIG. 1 is a schematic diagram showing an example of an IC card issuing system according to the present invention.
Figure 2:
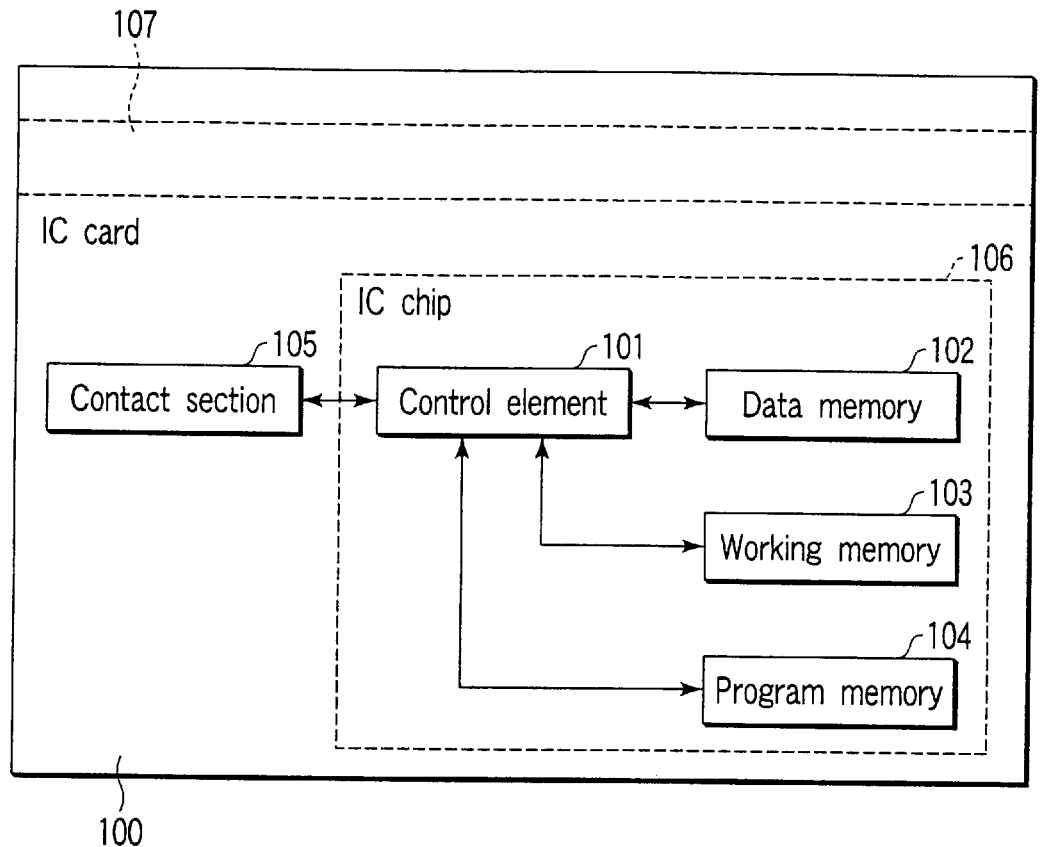
FIG. 2 is a schematic diagram showing an IC card applied to the IC card issuing system shown in FIG. 1.

FIG. 1 is a schematic block diagram showing an example of an IC card issuing system according to the present invention. On the other hand, FIG. 2 is a schematic block diagram showing an IC card applied to the IC card issuing system shown in FIG. 1.

As shown in FIG. 1, the IC card issuing system comprises an IC card 100, a card issuing apparatus 200 and a card stacker 300.

The card issuing apparatus 200 comprises a terminal main body 201, a hard disk drive (HDD) 202, a keyboard 203, a printer 204, a card reader/writer 205 and a display 206.

The terminal body 201 is, for example, a personal computer (PC). More specifically, the terminal body 201 comprises a CPU 201a serving as an arithmetic unit, and a memory 201b serving as a main storage. The CPU 201a controls a key setting process, which is the point of the present invention. Further, the terminal body 201 is connected to the hard disk drive (HDD) 202 serving as an auxiliary storage, and the keyboard 203 serving as an input device. The terminal body 201 is also connected to the printer 204, the card reader/writer 205 and the display.

The HDD 202 stores a data item definition file, a magnetic encoding data base file, a personal data base file, a common data baser file, a command code data base file, a print design definition file, etc.

The card issuing apparatus 200 takes in IC cards 100 one by one. The taken IC cards 300 are passed through the card issuing apparatus 200 and discharged to the card stacker 300.

As shown in FIG. 2, the IC card 100 comprises a contact portion 105, an IC chip 106 and a magnetic stripe portion 107. The IC chip 106 comprises a control element 101, a data memory 102, a working memory 103 and a program memory 104. The contact portion 105 and the IC chip 106 are integrally modularized and embedded in the IC card 100.

The control element 101 is, for example, a CPU. The control element executes a key setting process, which is the point of the present invention. The data memory 102 is a non-volatile memory, from which memory contents are erasable, for example, an EEPROM (electrically erasable and programmable ROM). The working memory 103 is a memory, which temporarily stores data processed by the control element 101, for example, a RAM (random access memory). The program memory 104 is a memory, which stores programs of the control element 101, for example, a mask ROM (read only memory). The contact portion 105 is a portion, which is electrically brought into contact with the card reader/writer 205 of the card issuing apparatus 200. Various data are exchanged through the contact portion 105 between the card issuing apparatus 200 and the IC card 100.

As described above, the card reader/writer 205 of the card issuing apparatus 200 exchanges various data between the card issuing apparatus 200 and the IC card 100 through the contact portion 105 of the IC card 100. Further, the card reader/writer 205 magnetically records various data on the magnetic stripe portion 107 of the IC card 100 and reads various data magnetically recorded on the magnetic stripe portion 107.

The card issuing apparatus 200 described above has the following functions (1) to (3).

(1) Means which write IC command data stored in the issuing apparatus 200 into the data memory 102 of the IC card 100 (the card reader/writer 205).

(2) Means which magnetically records magnetic encode data stored in the issuing apparatus 200 on the magnetic stripe portion 107 formed on the card surface of the IC card 100 (the card reader/writer 205).

(3) Means which prints print data stored in the issuing apparatus 200 on the card surface of the IC card 100 (the printer 204).

Figure 3:
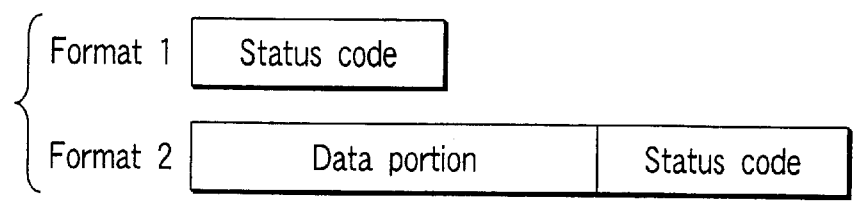
FIG. 3 is a diagram showing examples of formats of output information (response) output from the IC card side in reply to the command sent from the card issuing apparatus side (a key setting command, a special key setting command, etc.)

FIG. 3 is a diagram showing examples of formats of output information (response) output from the IC card side in reply to the command sent from the card issuing apparatus side (a key setting command, a special key setting command, etc.). Functions of the key setting command and the special key setting command will be described later.

A format 1 shown in FIG. 3 includes a status code as output information. The status code represents a result of execution of a command sent from the card issuing apparatus side.

A format 2 shown in FIG. 3 includes a data portion and a status code as output information. The status code represents a result of execution of a command sent from the card issuing apparatus side, as in the format 1. The data portion will be described later.

Figure 4:
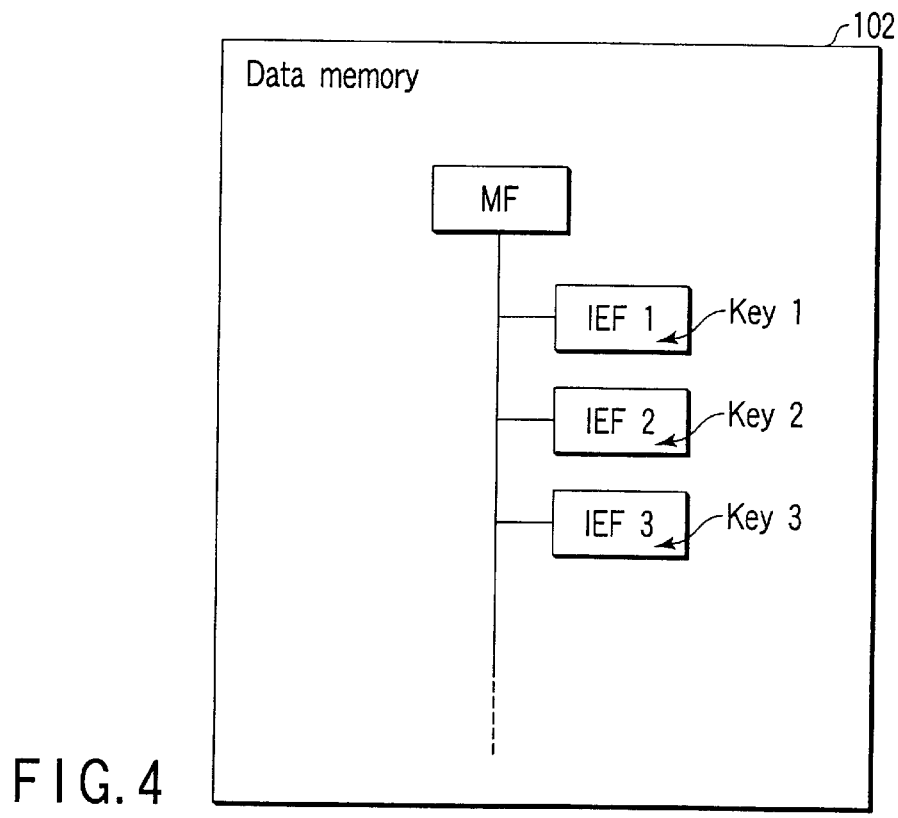
FIG. 4 is a diagram showing an example of a file structure of the data memory of the IC card.

FIG. 4 is a diagram showing an example of a file structure of the data memory of the IC card.

As shown in FIG. 4, the file structure in the data memory of the IC card has a structure in which a main file (MF) is centered, and a plurality of sub-files (IEF1, IEF2, IEF3) are depending from the main file. The sub-files (IEF1, IEF2, IEF3) function as key storage portions: the sub-file (IEF1) stores a key 1, the sub-file (IEF2) stores a key 2 and the sub-file (IEF3) stores a key 3. The key 1, the key 2 and the key 3 are collectively called a key group.

In the IC chip 106, an authentication process is performed by using the key group. The key group is set by a key setting command or a special key setting command issued by the card issuing apparatus 200, when the card is issued. To execute a correct authentication process, a correct key group must be set.

Therefore, according to the present invention, a key group is set to the IC card 100 by the card issuing apparatus 200 in accordance with a key setting process 1 and a key setting process 2 described below. The key setting process 1 and key setting process 2 can prevent incorrect key setting in the IC card.

It is assumed that a key 1, a key 2, . . . and a key N are set as a key group. Further, to make the explanation easy, the case where N=3 will be described. That is, a key 1, a key 2 and a key 3 are assumed to be set as a key group.

First, a key setting process 1 will be described. In the key setting process 1, the operator compares and confirms, by a visual check, a normal key process result obtained as a result of processing a normal key group with a predetermined algorithm and a set key process result obtained as a result of processing the key group set in the IC card 100 with a predetermined algorithm, so that setting of an incorrect key group in the IC card 100 can be avoided.

Figure 5:
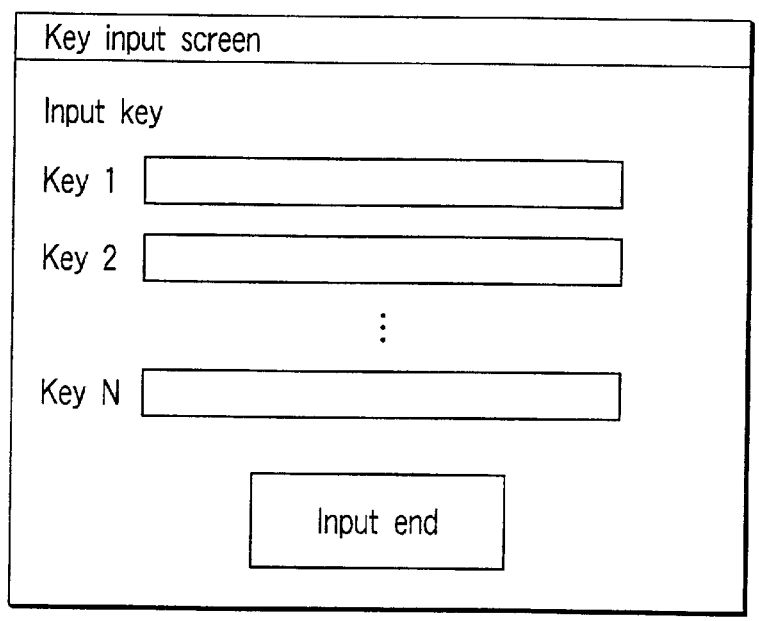
FIG. 5 is a diagram showing an example of a key input screen displayed on the display of the card issuing apparatus.

Details of the key setting process 1 will now be described. In the key setting time, the display 206 of the card issuing apparatus 200 displays a key input screen as shown in FIG. 5. The key input screen shows a plurality of key input areas through which a plurality of keys constituting the key group are input, and an input end button to give directions to end the key input.

The key group to be set (the key 1, the key 2 and the key 3) is input to the terminal body 201 through operation of the keyboard 203 by the operator. More specifically, the cursor is moved to a predetermined key input area through operation of the keyboard 203, and a key is input through the keyboard 203. When input of all keys (the key 1, the key 2 and the key 3) is completed and the end of the key input is directed by the input end button, setting of the keys is started.

The setting of the keys is executed by a key setting command and a special key setting commend. Definitions of the commands will now be described. The HDD 202 of the card issuing apparatus 200 stores a command code database file as shown in FIG. 6. A plurality of command codes are recorded in the command code data base file. The command codes give directions for setting conditions to the control element of the IC card 100 and writing accompanying data sent along with the command codes in the data memory 102 of the IC card 100.

As shown in FIG. 6, a command code column, an accompanying data column and a display output information column are prepared in the command code data base file. For example, the accompanying data of the command code 18 defines the key 1 of the key input screen and the display output information defines non-display. The accompanying data of the command code 19 defines the key 2 of the key input screen and the display output information defines non-display. The accompanying data of the command code 25 defines the key N (=3) of the key input screen and the display output information defines a set key process result in the key setting result screen.

In other words, the key input to the key input area for the key 1 in the key input screen shown in FIG. 5 is set as the key 1 to the IC card in accordance with the command code 18 generated on the basis of the command code data base stored in the HDD 202 of the cards issuing apparatus 200. The command code 18 is called a key setting command. More specifically, the key setting command accompanied with the key 1 is sent from the card reader/writer 205 to the contact portion 105 of the IC card 100. The key setting command received by the contact portion is decoded by the control element 101. When it is decoded, it is found to be a setting command of the key 1, and the key 1 is set to the sub-file (IEF1) of the data memory 102 based on the decode result. Then, normal end information is sent to the card reader/writer 205 from the contact portion 105 as a response to the key setting command. In other words, the terminal body 201 is notified of the normal end information. Incidentally, the response to the key setting command has the format 1 shown in FIG. 3, and the normal end information corresponds to the status code.

Then, the key input to the key input area for the key 2 in the key input screen shown in FIG. 5 is set as the key 2 to the IC card in accordance with the command code 19 generated on the basis of the command code database. The command code 19 is also called a key setting command. More specifically, the key setting command accompanied with the key 2 is sent from the card reader/writer 205 to the contact portion 105 of the IC card 100. The key setting command received by the contact portion is decoded by the control element 101. When it is decoded, it is found to be a setting command of the key 2, and the key 2 is set to the sub-file (IEF2) of the data memory 102 based on the decode result. Then, normal end information is sent to the card reader/writer 205 from the contact portion 105 as response to the key setting command. In other words, the terminal body 201 is notified of the normal end information. Incidentally, the response to the key setting command has the format 1 shown in FIG. 3, and the normal end information corresponds to the status code.

Thereafter, the last key, i.e., the key 3 is set as will be described below and a response as will be described below is returned. The key input to the key input area for the key N (=3) in the key input screen shown in FIG. 5 is set as the key N (=3) to the IC card in accordance with the command code 25 generated on the basis of the command code data base. The command code 25 is called a special key setting command. More specifically, the special key setting command accompanied with the key N (=3) is sent from the card reader/writer 205 to the contact portion 105 of the IC card 100. The special key setting command received by the contact portion is decoded by the control element 101. When it is decoded, it is found to be a setting command of the key N (=3), and the key N (=3) is set to the sub-file (IEF3) of the data memory 102 based on the decode result. Then, normal end information and a normal key process result are sent to the card reader/writer 205 from the contact portion 105 as a response to the key setting command. In other words, the terminal body 201 is notified of the normal end information and the normal key process result. Incidentally, the response to the key setting command has the format 2 shown in FIG. 3, the normal key process result corresponds to the data portion while the normal end information corresponds to the status code.

Figure 7:
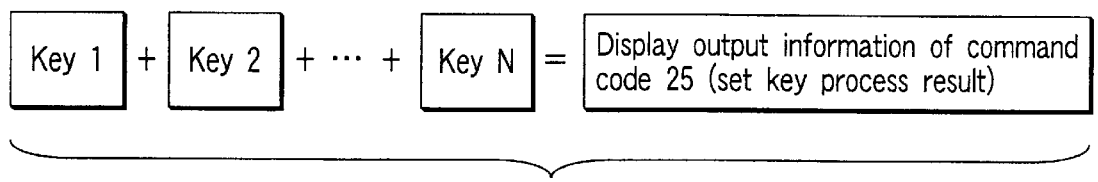
FIG. 7 is a diagram showing a state in which a set key process result is generated from a plurality of keys set in the IC card with a predetermined algorithm.
Figure 8:
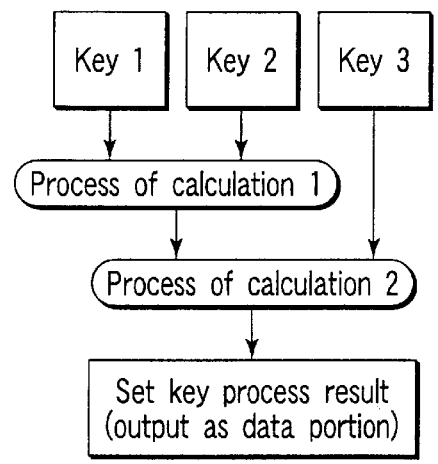
FIG. 8 is a diagram showing a state in which a set key process result is generated from a plurality of keys set in the IC card with a predetermined algorithm as in FIG. 7.

The set key process result will now be described. The key group (the key 1, the key 2 and the key 3) set to the IC card 100 is processed with a predetermined algorithm (a key group processing program). The set key process result is obtained by this process. It is assumed that the key group processing program is stored in the program memory 104. FIGS. 7 and 8 show images of generation of set key process results.

Figure 9:
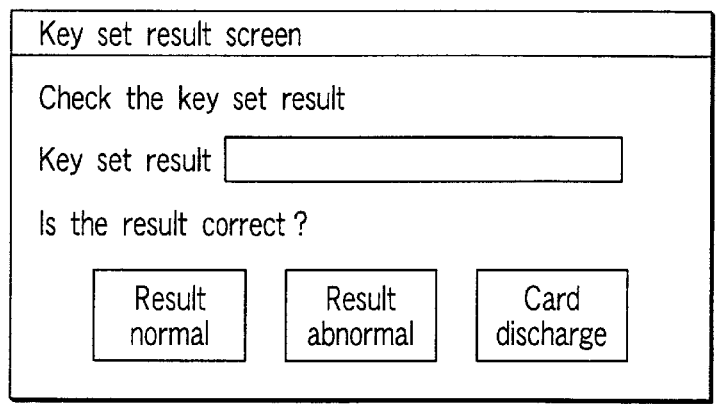
FIG. 9 is a diagram showing an example of a key set result screen displayed on the display of the card issuing apparatus.

The terminal body 201 displays the information whose display output is defined in the command code data base file, i.e., the set key process result sent as the response from the IC card 100 on a key set result screen as shown in, for example, FIG. 9. The key set result screen displayed on the display 206 shows a result normal button indicating normality of the set key group, a result abnormal button indicating abnormality of the set key group, and a card discharge button indicating discharge of the IC card.

On the other hand, a normal key process result obtained as a result of processing the normal key group with a predetermined algorithm (a key processing program) is prepared in advance. The term "prepared in advance" means that the operator is notified of it by some means in advance or that it is prestored in the HDD 202 of the card issuing apparatus 200.

The operator compares, by a visual check, the key set result (the set key process result) displayed on the key set result screen with the normal key process result prepared in advance. As a result of the comparison, if the two coincide, the operator operates the keyboard 203 and clicks the result normal button of the key set result screen. In this case, the card in which the key is set by the aforementioned key setting process 1 is formally issued. If they do not coincide, the operator operates the keyboard 203 and clicks the result abnormal button or the card discharge button. In this case, issue of the card is aborted.

Figure 10:
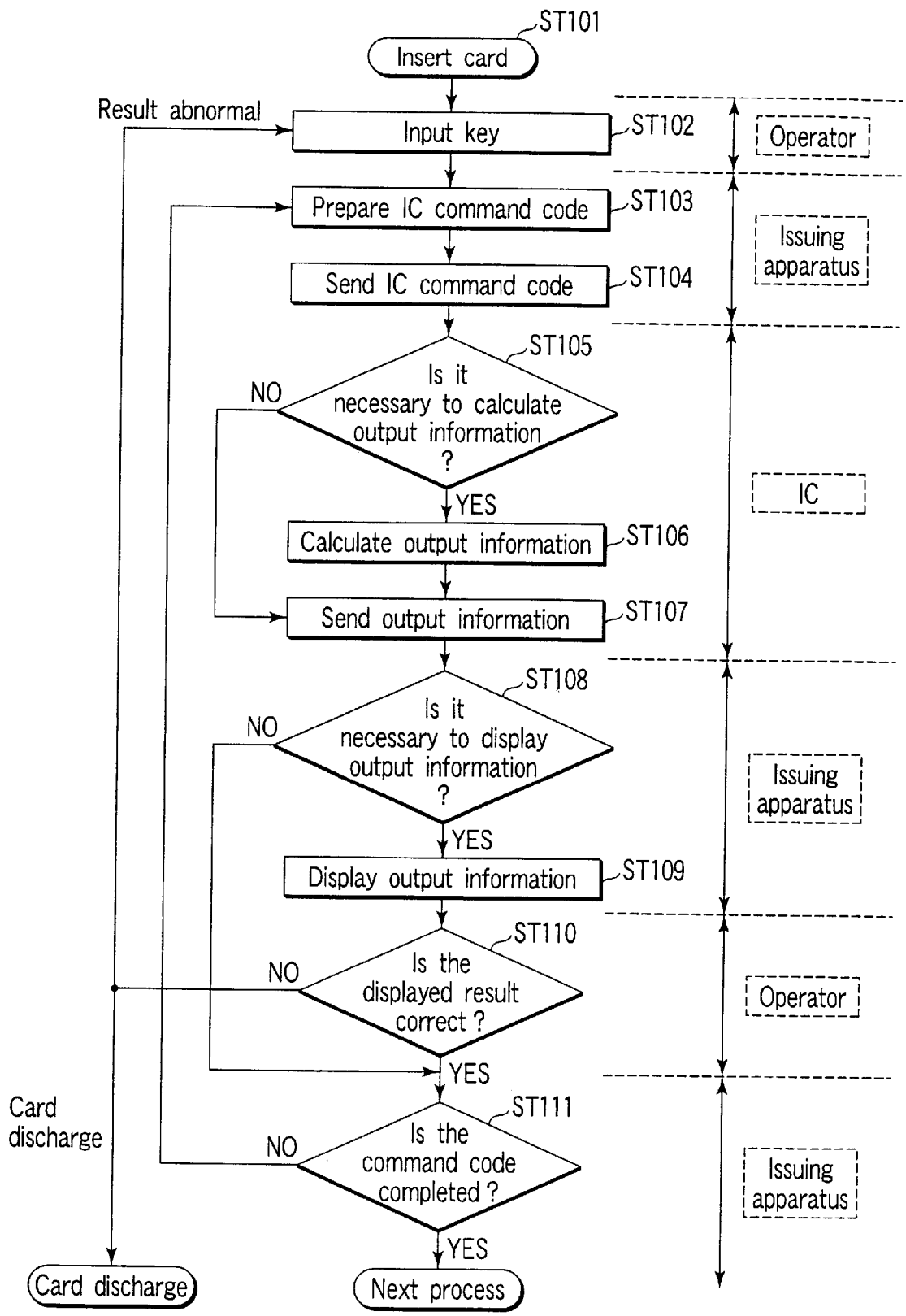
FIG. 10 is a flowchart illustrating a key setting process 1.

FIG. 10 is a flowchart illustrating the key setting process 1 described above. The key setting process 1 described above will be reviewed with reference to the flowchart shown in FIG. 10.

An IC card is inserted into the card reader/writer 205 of the card issuing apparatus 200 (ST101). A key is input to the key input screen through keyboard operation (ST102). The steps ST101 and ST102 are executed by the operator.

When the key is input (ST102) and the input end button is clicked, an IC command code (a key setting command or special key setting command) is prepared in the card issuing apparatus 200 (ST103). The IC command code (the key setting command or special key setting command) is sent from the card issuing apparatus 200 to the IC card 100 (ST104). The steps ST103 and ST104 are executed by the card issuing apparatus 200.

On the IC card 100 side, if the key setting command is received as the IC command code, it is unnecessary to calculate a set key process result (output information) (ST105, NO). On the other hand, if the special key setting command is received as the IC command code, it is necessary to calculate a set key process result (output information) (ST105, YES), and a set key process result (output information) is calculated (ST106). Then, the set key process result (output information) is sent from the IC card 100 side to the card issuing apparatus 200 side (ST107). The steps ST105 to ST107 are executed by the IC card 100.

The card issuing apparatus 200, which has received the set key process result (output information) (ST108, YES), displays the received set key process result (output information) (ST109). The steps ST108 and ST109 are executed by the card issuing apparatus 200.

The operator compares, by a visual check, the set key process result (output information) displayed on the card issuing apparatus 200 with the normal key process result prepared in advance. As a result of the comparison, if the two coincide (ST110), the operator operates the keyboard 203 and clicks the result normal button of the key set result screen. In this case, the process by the command is successfully completed (ST111) and the card in which the key is set is formally issued. If they do not coincide (ST110, NO), the operator operates the keyboard 203 and clicks the result abnormal button of the key set result screen. In this case, the card is discharged for the present, issue of the card is aborted, and the key input screen is displayed again.

Next, a key setting process 2 will be described. In the key setting process 2, the issuing apparatus 200 compares and confirms a normal key process result obtained as a result of processing a normal key group with a predetermined algorithm and a set key process result obtained as a result of processing the key group set in the IC card 100 with a predetermined algorithm, so that setting of an incorrect key group in the IC card 100 can be avoided.

Details of the key setting process 2 will now be described. The key group to be set (the key 1, the key 2 and the key 3) is input to the terminal body 201 through operation of the keyboard 203 by the operator via the key input screen shown in FIG. 5. The key group input to the terminal body 201 through operation of the keyboard 203 is set to the IC card 200 in accordance with the key setting command and the special key setting command. Details of the key setting are the same as those of the key setting process 1. The portions different from those of the key setting process 1 will mainly be described.

The HDD 202 of the card issuing apparatus 200 stores a command code database file as shown in FIG. 11. A plurality of command codes are recorded in the command code data base file. A command code column, an accompanying data column and a display output information column are prepared in the command code data base file. For example, the accompanying data of the command code 18 defines the key 1 of the key input screen and the IC output information defines "9000". The accompanying data of the command code 19 defines the key 2 of the key input screen and the IC output information defines "9000". The accompanying data of the command code 25 defines the key N (=3) of the key input screen and the IC output information defines "543212345432109000".

In other words, the key input to the key input area for the key 1 in the key input screen shown in FIG. 5 is set as the key 1 to the IC card in accordance with the command code 18 generated on the basis of the command code data base stored in the HDD 202 of the cards issuing apparatus 200. The command code 18 is called a key setting command. More specifically, the key setting command accompanied with the key 1 is sent from the card reader/writer 205 to the contact portion 105 of the IC card 100. The key setting command received by the contact portion is decoded by the control element 101. When it is decoded, it is found to be a setting command of the key 1, and the key 1 is set to the sub-file (IEF1) of the data memory 102 based on the decode result. Then, normal end information is sent to the card reader/writer 205 from the contact portion 105 as a response to the key setting command. In other words, the terminal body 201 is notified of the IC output information. Incidentally, the response to the key setting command has the format 1 shown in FIG. 3, and the IC output information corresponds to the status code.

Figure 12:
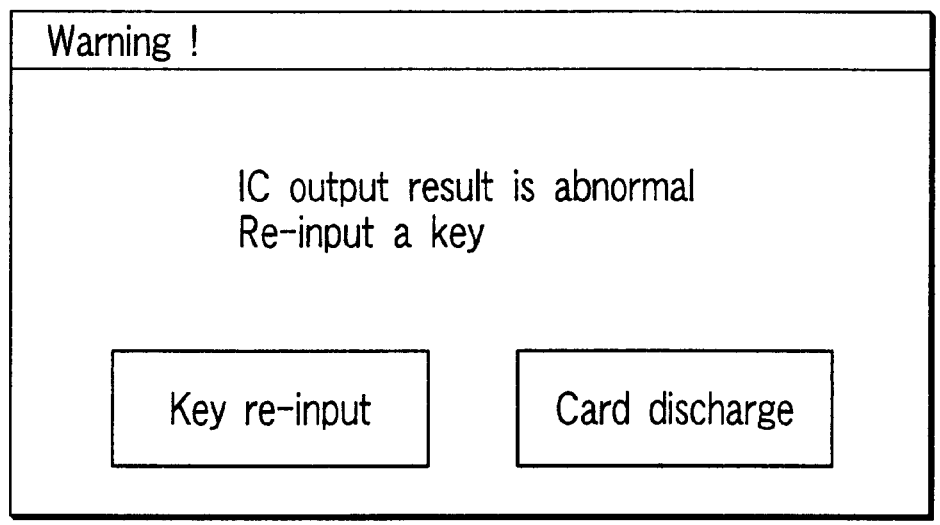
FIG. 12 is a diagram showing an example of a warning screen displayed on the display of the card issuing apparatus.

The IC output information sent from the IC card 100 is compared by the terminal body 201 with the IC output information of the command code 18 of the command code database stored in the HDD 202. As a result of the comparison, if the two coincide, it is considered that the process of the command code 18 is successfully completed, and a next key setting process is performed. If they do not coincide, it is considered that the process abends, and a warning screen as shown in FIG. 12 is displayed on the display 206 of the card issuing apparatus 200. When a key re-input button is clicked by the operator, the key input screen is displayed again. When a card discharge button is clicked, the card is discharged and issue of the card is aborted.

Then, the key input to the key input area for the key 2 in the key input screen shown in FIG. 5 is set as the key 2 to the IC card in accordance with the command code 19 generated on the basis of the command code database. The command code 19 is also called a key setting command. More specifically, the key setting command accompanied with the key 2 is sent from the card reader/writer 205 to the contact portion 105 of the IC card 100. The key setting command received by the contact portion is decoded by the control element 101. When it is decoded, it is found to be a setting command of the key 2, and the key 2 is set to the sub-file (IEF2) of the data memory 102 based on the decode result. Then, normal end information is sent to the card reader/writer 205 from the contact portion 105 as a response to the key setting command. In other words, the terminal body 201 is notified of the IC output information. Incidentally, the response to the key setting command has the format 1 shown in FIG. 3, that is, the normal end information corresponds to the status code.

The IC output information sent from the IC card 100 is compared by the terminal body 201 with the IC output information of the command code 18 of the command code data base stored in the HDD 202, in the same manner as in the process of the command code 18 described above. As a result of the comparison, if the two coincide, it is considered that the process of the command code 18 is successfully completed, and a next key setting process is performed. If they do not coincide, it is considered that the process abends, and a warning screen as shown in FIG. 12 is displayed on the display 206 of the card issuing apparatus 200. When the key re-input button is clicked by the operator, the key input screen is displayed again. When the card discharge button is clicked, the card is discharged and issue of the card is aborted.

Thereafter, the last key, i.e., the key 3 is set as will be described below and a response as will be described below is returned. The key input to the key input area for the key N (=3) in the key input screen shown in FIG. 5 is set as the key N (=3) to the IC card in accordance with the command code 25 generated on the basis of the command code data base. The command code 25 is called a special key setting command. More specifically, the special key setting command accompanied with the key N (=3) is sent from the card reader/writer 205 to the contact portion 105 of the IC card 100. The special key setting command received by the contact portion is decoded by the control element 101. When it is decoded, it is found to be a setting command of the key N (=3), and the key N (=3) is set to the sub-file (IEF3) of the data memory 102 based on the decode result. Then, normal end information and a normal key process result are sent to the card reader/writer 205 from the contact portion 105 as a response to the key setting command. In other words, the terminal body 201 is notified of the IC output information and the normal key process result. Incidentally, the response to the key setting command has the format 2 shown in FIG. 3, and the normal key process result correspond to the data portion and the normal end information corresponds to the status code. The set key process result is the same as in the key setting process 1. Therefore, detailed explanations thereof will be omitted.

The terminal body 201 compares the set key process result sent from the IC card 100 as a response with the normal key process result prepared in advance in the HDD 202 of the card issuing apparatus, and confirms whether the key is correctly set or not. Incidentally, a set key process result is chosen as an object of the comparison with reference to the IC output information in the command code database. The normal key process result prepared in advance is obtained as a result of processing the normal key group with a predetermined algorithm (key processing program).

As a result of the comparison between the set key process result and the normal key process result, if the two coincides, a card in which the key is set by the key setting process 2 is formally issued. If they do not coincide, a warning screen as shown in FIG. 12 is displayed on the display 206 of the card issuing apparatus 200. The warning screen shows warning information, a key re-input button indicating key re-input, and a card discharge button indicating discharge of the card. When the key re-input button is clicked by the operator, the key input screen is displayed again. When the card discharge button is clicked by the operator, the card is discharged.

Figure 13:
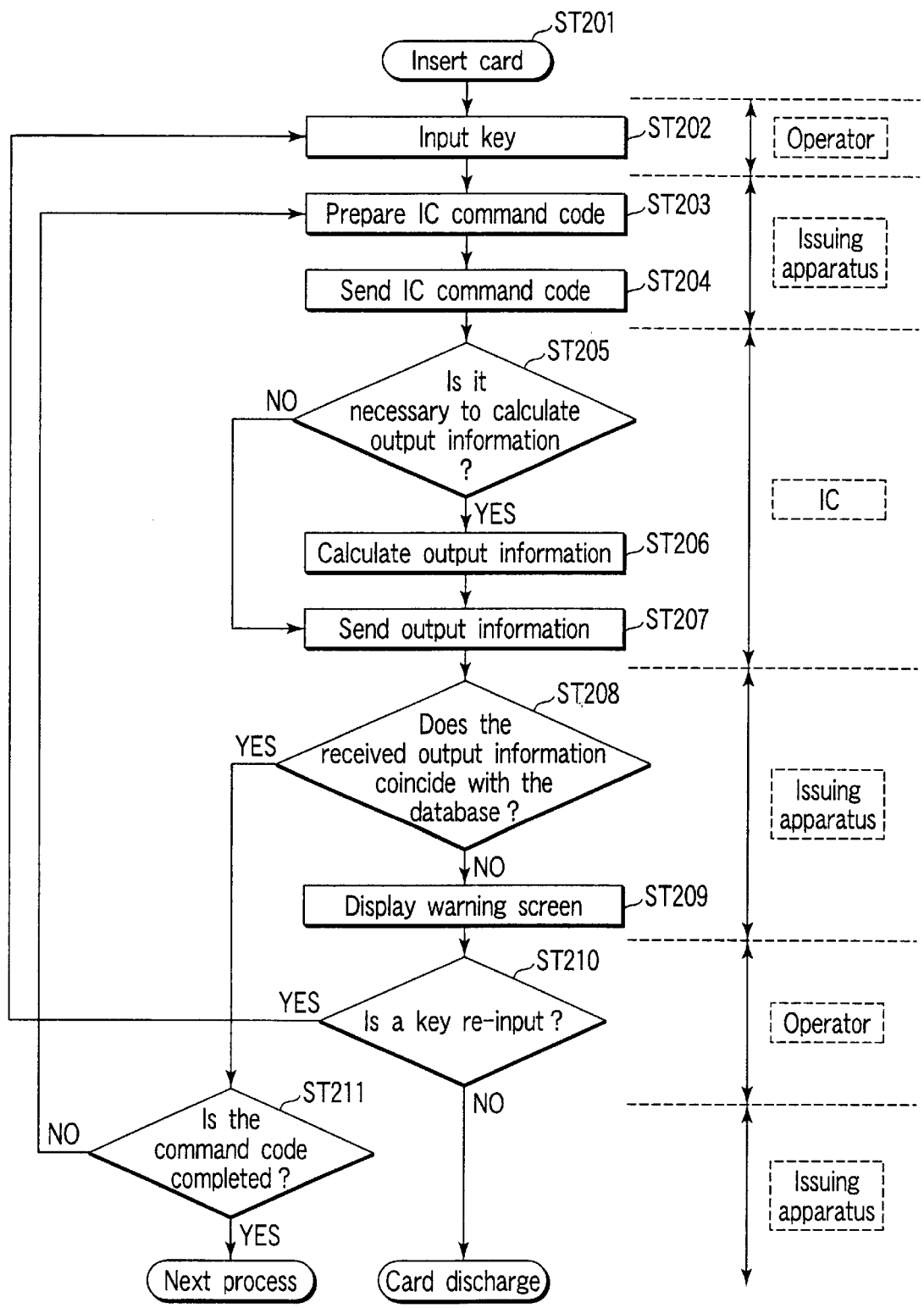
FIG. 13 is a flowchart illustrating a key setting process 2.

FIG. 13 is a flowchart illustrating the key setting process 2 described above. The key setting process 2 described above will be reviewed with reference to the flowchart shown in FIG. 13.

An IC card is inserted into the card reader/writer 205 of the card issuing apparatus 200 (ST201). A key is input to the key input screen through keyboard operation (ST202). The steps ST201 and ST202 are executed by the operator.

When the key is input (ST202) and the input end button is clicked, an IC command code (a key setting command or special key setting command) is prepared in the card issuing apparatus 200 (ST203). The IC command code (the key setting command or special key setting command) is sent from the card issuing apparatus 200 to the IC card 100 (ST204). The steps ST203 and ST204 are executed by the card issuing apparatus 200.

On the IC card 100 side, if the key setting command is received as the IC command code, it is unnecessary to calculate a set key process result (output information) (ST205, NO). On the other hand, if the special key setting command is received as the IC command code, it is neces-sary to calculate a set key process result (output information) (ST205, YES), and a set key process result (output information) is calculated (ST206). Then, the set key process result (output information) is sent from the IC card 100 side to the card issuing apparatus 200 side (ST207). The steps ST205 to ST207 are executed by the IC card 100.

The card issuing apparatus 200, which has received the set key process result (output information) (ST208, YES), compares the received set key process result with the normal key process result prepared in advance, and checks whether a correct key is set or not. As a result of the check, if it is found that a correct key is set, i.e., if the set key process result is correct (ST208, YES), the process of this key is completed (ST211). If the command code, whose process has been completed, is not final, a process of generating a next IC command code is performed (ST203). In other words, a card in which a key is set is formally issued. On the other hand, as a result of the check, if it is found that a correct key is not set, i.e., if the set key process result is incorrect (ST208, NO), a warning screen is displayed (ST209). If a key re-input button of the warning screen is clicked (ST210, YES), the key input screen is displayed again (ST202), and key re-input is requested. If a card discharge button of the warning screen is clicked (ST210, NO), the card is discharged for the present, and issue of the card is aborted.

Figure 14:
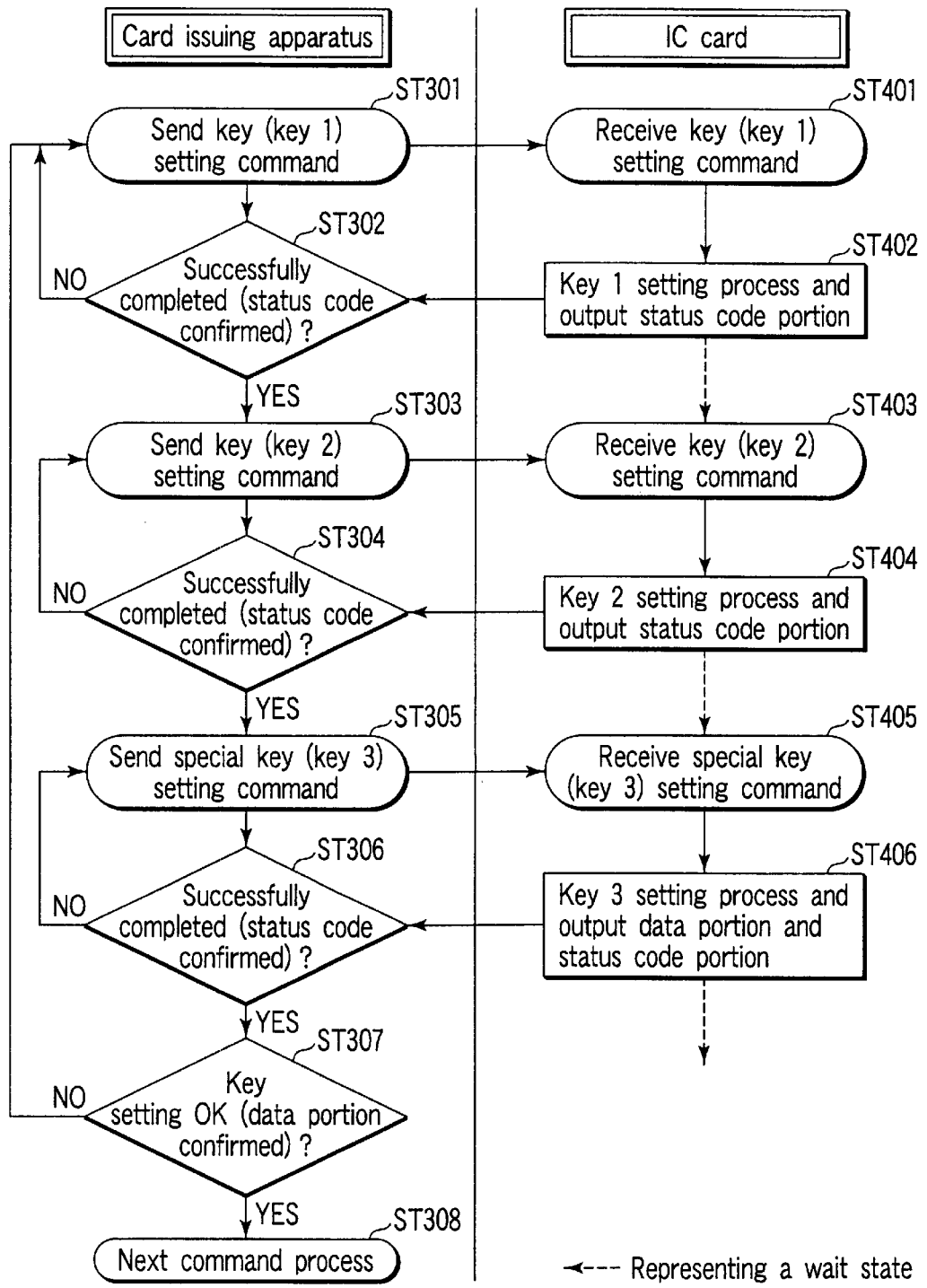
FIG. 14 is a flowchart showing a state in which data is exchanged between the card issuing apparatus and the IC card in the key setting time.

FIG. 14 is a flowchart showing a state in which data is exchanged between the card issuing apparatus and the IC card in the key setting time.

First, a key setting command for setting the key 1 is sent from the card issuing apparatus 200 (ST301), and received by the IC card 100 (ST401). At this time, the key 1 is set to the IC card 100 based on the received key setting command. The status code representing that the key 1 is set is stored in the status code portion of the format 1 shown in FIG. 3 and output (ST402). The card issuing apparatus 200 receives the status code output from the IC card 100, and confirms that the process based on the key setting command has been successfully completed (ST302, YES).

Subsequently, a key setting command for setting the key 2 is sent from the card issuing apparatus 200 (ST303) and received by the IC card 100 (ST403). At this time, the key 2 is set to the IC card 100 based on the received key setting command. The status code representing that the key 2 is set is stored in the status code portion of the format 1 shown in FIG. 3 and output (ST404). The card issuing apparatus 200 receives the status code output from the IC card 100, and confirms that the process based on the key setting command has been successfully completed (ST304, YES).

Subsequently, a special key setting command for setting the key 3 is sent from the card issuing apparatus 200 (ST305) and received by the IC card 100 (ST405). At this time, the key 3 is set to the IC card 100 based on the received special key setting command. The status code representing that the key 3 is set is stored in the status code portion of the format 2 shown in FIG. 3 and output (ST406). The card issuing apparatus 200 receives the status code and the set key process result output from the IC card 100, and confirms that the process based on the key setting command has been successfully completed (ST306, YES).

Further, it confirms that the key is-correctly set to the IC card 100 from the set key process result stored in the data portion (ST307, YES), and a process of a next command is performed (ST308).

As described above, according to the present invention, it is possible to confirm that a plurality of keys on the basis of a plurality of command (a key setting commands and a special key set command) are correctly set. As a result, setting of an incorrect key is prevented.

In connection with the key setting process 1, a case was described in which the operator has obtained the normal key process result in advance and inputs the key through the key setting screen. Further, in connection with the key setting process 2, a case was described in which the normal key process result is prestored in the HDD of the card issuing apparatus 200 and the key is input through the key setting screen.

However, the present invention is not limited to the above. For example. The normal key process result may be screen-input to the card issuing apparatus 200. Alternatively, the key may be prestored in the HDD of the card issuing apparatus 200, rather than screen-input.

Thus, a plurality of cases as follows are considered. A key is screen-input, and a normal key process result is visually checked. A key is screen-input, and a normal key process result is predefined (stored in the card processing apparatus). A key is screen-input, and a normal key process result is also screen-input. A key is predefined (stored in the card processing apparatus) and a normal key process result is visually checked. A key is predefined (stored in the card issuing apparatus), and a normal key process result is also predefined (stored in the card issuing apparatus). A key is predefined (stored in the card issuing apparatus), and a normal key process result is screen-input.

As described above, according to the present invention, it is possible to provide an IC card, an IC card issuing apparatus, an IC card issuing system and an IC card issuing method, which can prevent a plurality of keys to retain the security of the IC card from being incorrectly set in the IC card.

What is claimed is:

1. An IC card comprising:
   communication means for performing communication of data with an IC card issuing apparatus;
   storage means for storing data;
   key setting means for, when the data received through the communication means is a key setting command, setting a key accompanying the key setting command to the storage means and sending through the communication means a response including information representing that a process in accordance with the key setting command has been completed; and
   final key setting means for, when the data received through the communication means is a special key setting command, setting a key accompanying the special key setting command to the storage means, generating a set key process result based on all keys set to the storage means, and sending through the communication means a response including information representing that a process in accordance with the special key setting command has been completed and the set key process result.

2. An IC card issuing apparatus comprising:
   receiving means for receiving input of a plurality of keys set for an IC card;
   communication means for performing communication of data with the IC card;
   storage means for storing a key setting command to set a key which is received by the receiving means and which does not correspond to a key to be finally set to the IC card and cause a response including a result of a process in accordance with the command to be sent, and a special key setting command to set a key which is received by the receiving means and which is to be finally set to the IC card and cause a response including a process result in accordance with the command and a set key process result generated based on all set keys to be sent;
   key setting means for causing the key setting command to be accompanied with the key which is received by the receiving means and which does not correspond to the key to be finally set to the IC card, sending the key setting command through the communication means, and receiving a response to the key setting command through the communication means; and
   final key setting means for causing the special key setting command to be accompanied with the key which is received by the receiving means and which is to be finally set to the IC card, sending the special key setting command through the communication means, and receiving a response to the special key setting command through the communication means.

3. An IC card issuing apparatus according to claim 2, comprising display means for displaying the set key process result included in the response to the special key setting command.

4. An IC card issuing apparatus according to claim 3, comprising re-receiving means for receiving re-input of the plurality of keys set for the IC card.

5. An IC card issuing apparatus according to claim 2, comprising:
   storing means for storing a normal key process result generated based on all normal keys to be set to the IC card; and
   confirming means for confirming whether all keys set to the IC card are normal keys by comparing the normal key process result stored in the storing means with the set key process result included in the response to the special key setting command.

6. An IC card issuing apparatus according to claim 5, comprising:
   display means for displaying a confirmation result obtained by the confirming means; and
   re-receiving means for receiving re-input of the plurality of keys set for the IC card, when the confirming means confirms that a key which is not normal is set to the IC card.

7. An IC card issuing system including an IC card and an IC card issuing apparatus which sets a key to the IC card,
   said IC card issuing apparatus comprising:
   receiving means for receiving input of a plurality of keys set for an IC card;
   first communication means for performing communication of data with the IC card;
   command storage means for storing a key setting command to set a key which is received by the receiving means and which does not correspond to a key to be finally set to the IC card and cause a response including a result of a process in accordance with the command to be sent, and a special key setting command to set a key which is received by the receiving means and which is to be finally set to the IC card and cause response including a process result in accordance with the command and a set key process result generated based on all set keys to be sent;
   first key setting means for causing the key setting command to be accompanied with the key which is received by the receiving means and which does not correspond to the key to be finally set to the IC card, sending the key setting command through the first communication means, and receiving a response to the key setting command through the first communication means; and first final key setting means for causing the special key setting command to be accompanied with the key which is received by the receiving means and which is to be finally set to the IC card, sending the special key setting command through the first communication means, and receiving a response to the special key setting command through the first communication means, and said IC card comprising:

second communication means for performing communication of data with the IC card issuing apparatus;

data storage means for storing data;

second key setting means for, when the data received through the second communication means is a key setting command, setting a key accompanying the key setting command to the storage means and sending through the second communication means a response including information representing that a process in accordance with the key setting command has been completed; and second final key setting means for, when the data received through the second communication means is a special key setting command, setting a key accompanying the special key setting command to the storage means, generating a set key process result based on all keys set to the storage means, and sending through the second communication means a response including information representing that a process in accordance with the special key setting command has been completed and the set key process result.

8. An IC card issuing system according to claim 7, wherein the IC card issuing apparatus comprises display means for displaying the set key process result included in the response to the special key setting command.

9. An IC card issuing system according to claim 8, wherein the IC card issuing apparatus comprises re-receiving means for receiving re-input of the plurality of keys set for the IC card.

10. An IC card issuing system according to claim 7, wherein the IC card issuing apparatus comprises:

storing means for storing a normal key process result generated based on all normal keys to be set to the IC card; and confirming means for confirming whether all keys set to the IC card are normal keys by comparing the normal key process result stored in the storing means with the set key process result included in the response to the special key setting command.

11. An IC card issuing system according to claim 10, wherein the IC card issuing apparatus comprises:

display means for displaying a confirmation result obtained by the confirming means; and re-receiving means for receiving re-input of the plurality of keys set for the IC card, when the confirming means confirms that a key which is not normal is set to the IC card.

12. An IC card issuing method for setting a key to an IC card and issuing the IC card in which the key is set, the method comprising:

a first step of receiving input of a plurality of keys set for the IC card;

a second step of sending, from an IC card issuing apparatus to the IC card, a key setting command to command setting of a key and to cause a response including a result of a process in accordance with the command to be sent, the command being accompanied with the key which is received by the first step and which does not correspond to a key to be finally set to the IC card;

a third step of receiving the key setting command sent by the second step, setting the key accompanying the key setting command, and causing a response including information representing that the process in accordance with the key setting command has been completed to be sent from the IC card to the IC card issuing apparatus;

a fourth step of receiving the response sent by the third step;

a fifth step of sending, from the IC card issuing apparatus to the IC card, a special key setting command to command setting of a key and to cause a response including a result of a process in accordance with the command and a set key process result generated based on all set keys to be sent, the command being accompanied with the key which is received by the first step and which is to be finally set to the IC card;

a sixth step of receiving the special key setting command sent by the fifth step, setting the key accompanied with the special key setting command, generating a set key process result generated based on all set keys, and causing a response including information representing that the process in accordance with the special key setting command has been completed and the set key process result to be sent from the IC card to the IC card processing apparatus; and a seventh step of receiving the response sent by the sixth step.

13. An IC card issuing method according to claim 12, comprising an eighth step of displaying the set key process result included in the response to the special key setting command received by the seventh step.

14. An IC card issuing method according to claim 13, comprising a ninth step of receiving re-input of the plurality of keys set for the IC card.

15. An IC card issuing method according to claim 12, comprising an eighth step of confirming whether all keys set to the IC card are normal keys by comparing the normal key process result generated based on all normal keys to be set to the IC card with the set key process result included in the response to the special key setting command received by the seventh step.

16. An IC card issuing method according to claim 15, comprising:

a ninth step of displaying a confirmation result obtained by the eighth step; and a tenth step of receiving re-input of the plurality of keys set for the IC card, when it is confirmed by the eighth step that a key which is not normal is set to the IC card.

* * * * *